US008462176B1

(12) United States Patent
Stubbs et al.

(10) Patent No.: US 8,462,176 B1
(45) Date of Patent: Jun. 11, 2013

(54) AUTOMATIC ANNOTATION GENERATION

(75) Inventors: Cameron M. Stubbs, Marietta, GA (US); Brandon Willets Cole, Kennesaw, GA (US)

(73) Assignee: Autodesk, Inc., San Rafael, CA (US)

( * ) Notice: Subject to any disclaimer, the term of this patent is extended or adjusted under 35 U.S.C. 154(b) by 903 days.

(21) Appl. No.: 12/603,219

(22) Filed: Oct. 21, 2009

Related U.S. Application Data

(60) Provisional application No. 61/118,974, filed on Dec. 1, 2008.

(51) Int. Cl.
*G09G 5/00* (2006.01)
*G06T 15/00* (2011.01)

(52) U.S. Cl.
USPC .......................................... 345/619; 345/419

(58) Field of Classification Search
USPC ............................ 345/619, 419, 617; 382/128
See application file for complete search history.

(56) References Cited

U.S. PATENT DOCUMENTS

| 2007/0078674 | A1* | 4/2007 | Weinberg et al. ................. 705/1 |
| 2008/0144897 | A1* | 6/2008 | Lal et al. ....................... 382/128 |
| 2011/0096964 | A1* | 4/2011 | Zheng et al. ................... 382/128 |

OTHER PUBLICATIONS

Attene, Marco et al., "Characterization of 3D shape parts for semantic annotation", Computer-Aided Design, vol. 41, Issue 10, Oct. 2009, pp. 756-763.*
Attene, Marco et al., "Part-based Annotation of Virtual 3D Shapes", Proceedings of cyberworldss' 07, spec. sess. on NASAGEM workshop, IEEE Computer Society Press (2007).*

* cited by examiner

*Primary Examiner* — Chante Harrison
(74) *Attorney, Agent, or Firm* — Fish & Richardson P.C.

(57) ABSTRACT

Systems, methods, and computer program products automatically generate and place annotations on an image (e.g., a rendering of a computer aided design model). Regions within an image are identified, and a representation of the image is generated, where the representation characterizes each of the image regions. Annotation leader locations are determined based on the representation of the image. Thereafter, annotation leaders are automatically generated and displayed using at the annotation leader locations.

21 Claims, 5 Drawing Sheets

AUTOMATIC ANNOTATION GENERATION

CROSS REFERENCE TO RELATED APPLICATION

This application claims the benefit under 35 U.S.C. §119 (e) of the filing date of U.S. Patent Application No. 61/118,974, filed Dec. 1, 2008, and entitled "Automatic Annotation Generation," the contents of which are incorporated herein by reference.

BACKGROUND

This disclosure relates to automatically annotating an image.

Computer Aided Design ("CAD") programs are capable of generating and rendering models that can be used to facilitate, for example, the design of assemblies and standalone components. It is often desirable to annotate such models to identify assembly components, to describe assembly/component attributes, or otherwise convey model-related information. To be effective, annotations should unambiguously identify the object to which the annotation is directed.

Generally, annotating a model is manually performed during the development of the model or after the model has been completed. In the latter scenario, waiting until after the model has been completed (which may be a lengthy process) can result in the loss of information. For example, when annotating a completed model, a CAD designer may forget to add an annotation directed to a potential problem discovered during the initial development phase of the model. However, regardless of when the model is annotated, the annotation process can consume significant portions of a CAD designer's efforts. Further, if the model is moved, scaled, and/or rotated, the previously-placed annotations may have to be manually manipulated or re-generated to accommodate the altered model, further burdening the CAD designer.

SUMMARY

In general, the subject matter of this specification relates to automatic annotation generation and placement.

One aspect of the subject matter described in this specification can be embodied in a method that includes identifying image regions within an image. A representation of the image is generated. The representation of the image characterizes each of the image regions. Annotation leader locations for the image are determined based on the representation of the image. Annotation leaders at the annotation leader locations are automatically generated. The annotation leaders and the image are displayed.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Annotating images (e.g., computer-generated drawings and model renderings) allows information to be added to an image, and to specify to which portion of the image the information is directed. For example, an image can be annotated with textual descriptions identifying particular portions of the image. As such, if the image is a rendering of a mechanical assembly model, the annotations can identify part numbers of the components comprising the assembly model. Systems and methods that automatically and unambiguously annotate an image (e.g., a rendering of a CAD model) are described herein.

Figure 1:
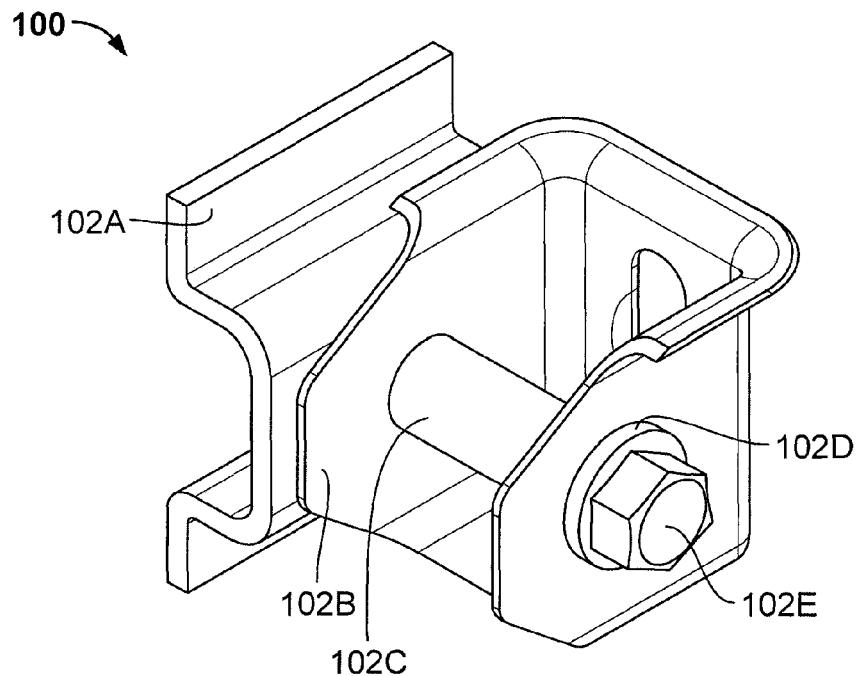
FIG. 1 illustrates an example image.

FIG. 1 illustrates an example image 100. An image 100 can be accessed and/or created using a computer program, such as a CAD program. For example, an image 100 can be a drawing, or a two or three-dimensional rendering of an assembly/assembly model (e.g., an electrical device and/or mechanical device) or a component defined by a CAD data file (e.g., DXF file, DWG file, etc.). The example image 100 shown in FIG. 1 is a three-dimensional rendering of a multi-component hinge assembly (e.g., a CAD model). The hinge assembly has individual components including a base 102A, an adapter 102B, a rod 102C, a plate 102D, and a nut 102E.

Images can be comprised of one or more image regions. For example, image regions can be identified (or defined) according to logical partitions associated with the image such as components or groups of components of the model from which the image is based (e.g., functional groups, groups of similar components, etc.). With respect to the example image 100, image regions can correspond to the individual components 102 forming the hinge assembly. One image region can correspond to each of the base 102A, the adapter 102B, the rod 102C, the plate 102D, and the nut 102E. In some implementations, each image region can be associated with a region identifier that identifies the image region. For example, the region identifier may be a part number of a component 102. In another example, the region identifier may correspond to a rendered color code of a component 102. In some implementations each component 102 (even like components) may have a unique color code permitting each component 102 to be rendered in a distinct color.

Figure 2:
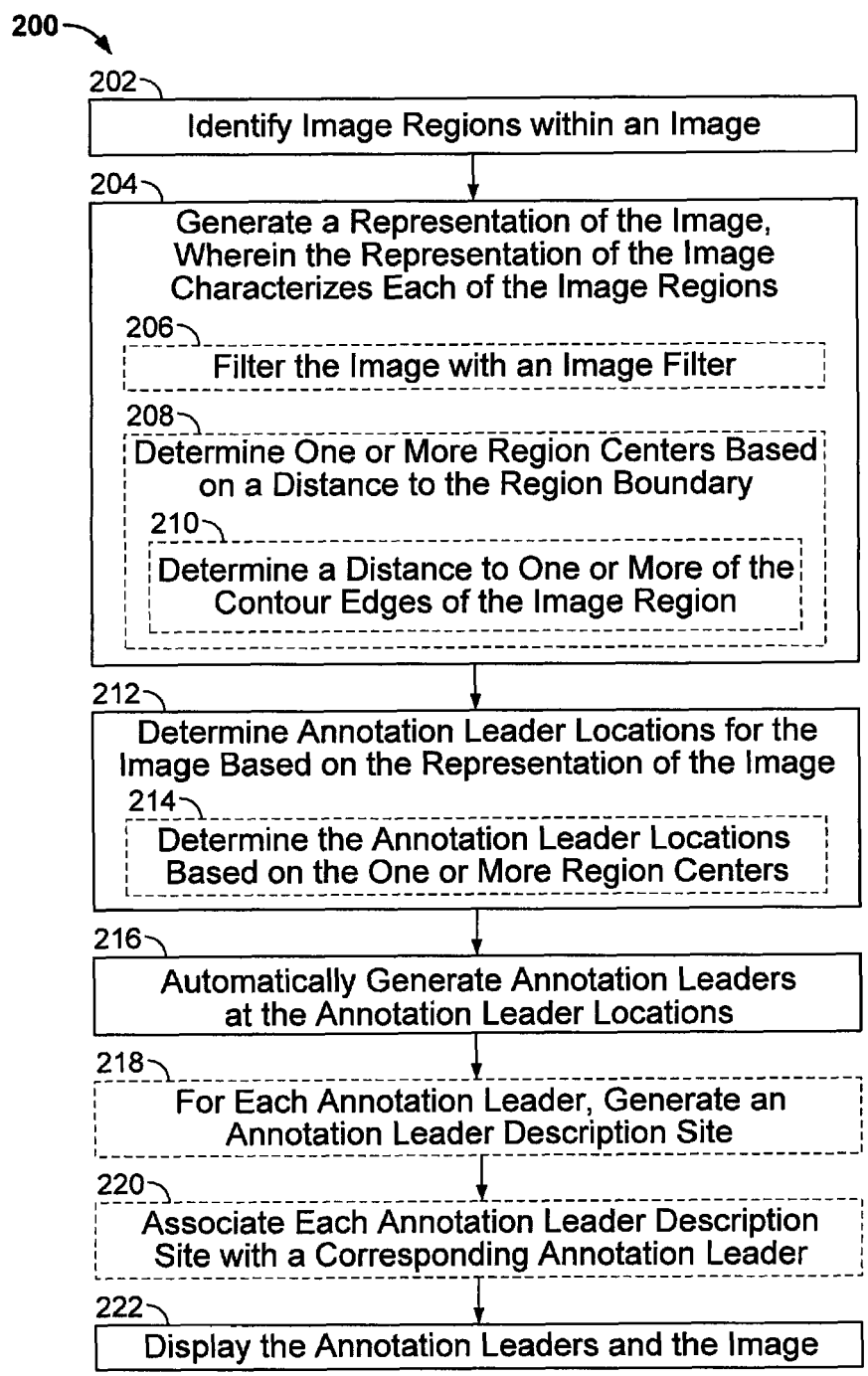
FIG. 2 illustrates an example process for automatically annotating an image.

FIG. 2 illustrates an example process 200 for automatically annotating an image 100. As described with reference to FIG. 8, the example process 200 can include processes performed by a system including a data processing apparatus and/or one or more clients permitting a user to interact with the data processing apparatus. After an image is identified (not illustrated), image regions within the image are identified (202). For example, image regions corresponding to each of the components 102 of the example image 100 can be identified from image 100. In some implementations, the image regions can be identified based on region identifiers (e.g., rendered color codes for each of the components 102).

Figure 3:
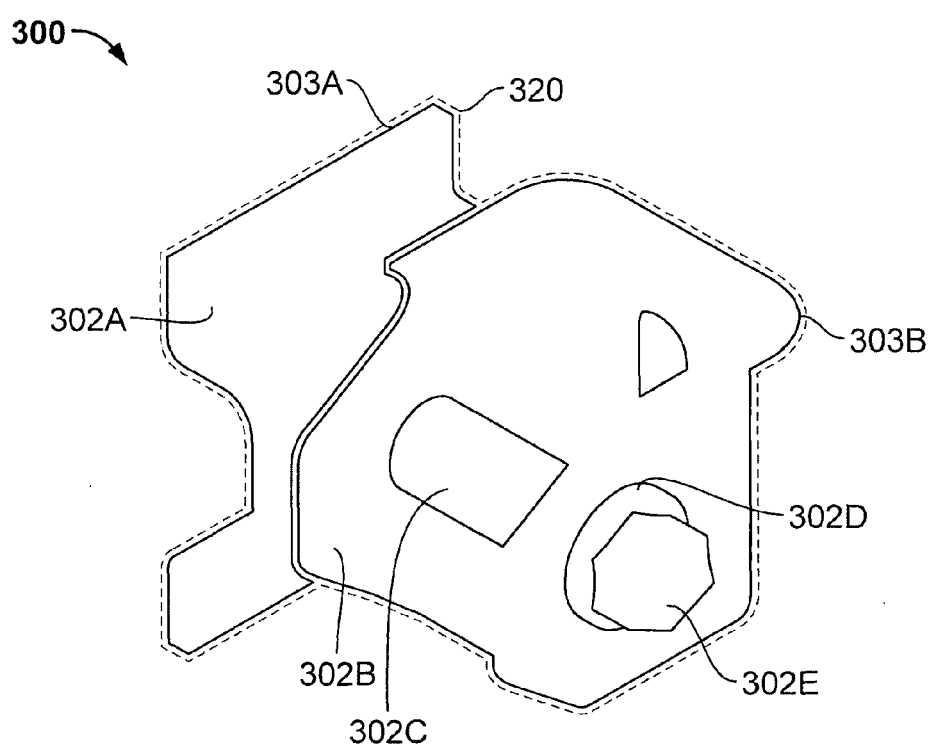
FIG. 3 illustrates example image regions of the image of FIG. 1.

FIG. 3 illustrates example image regions 302 of the image 100 of FIG. 1. For example, the image 100 can be rendered as an ID map 300 of the components 102 where each component 102 is associated with a unique color code and rendered/presented accordingly, e.g., the base component 102A can be associated with a yellow color code and rendered in yellow in the ID map 300. Thus, the ID map 300 presents the image 100 partitioned into individual components 102 based on the rendered color code associated with each component 102. Accordingly, image regions 302A-302E can correspond to, respectively, base 102A, adapter 102B, rod 102C, plate 102D, and nut 102E; and can be identified by the rendered colors of these components. In other implementations, the image regions 302 can be identified based on other image region characteristics, e.g., part numbers of the components 102.

Each image region 302 includes a region boundary. Each region boundary defines the boundary (extent) of the corresponding image region 302. The defined boundary can be based on the rendered colors of the image regions 302, e.g., the distinction between the rendered colors. For example, image region 302A may be rendered yellow and image region 302B may be rendered orange, and image regions 302A and 302B may have region boundaries 303A and 303B, respectively, defined at least in part by the line of demarcation between the two colors. Additionally, region boundaries (e.g., 303A and 303B) can include a relevant portion of the border of the image 320 if the image region forms a portion of the image border 320.

Figure 4:
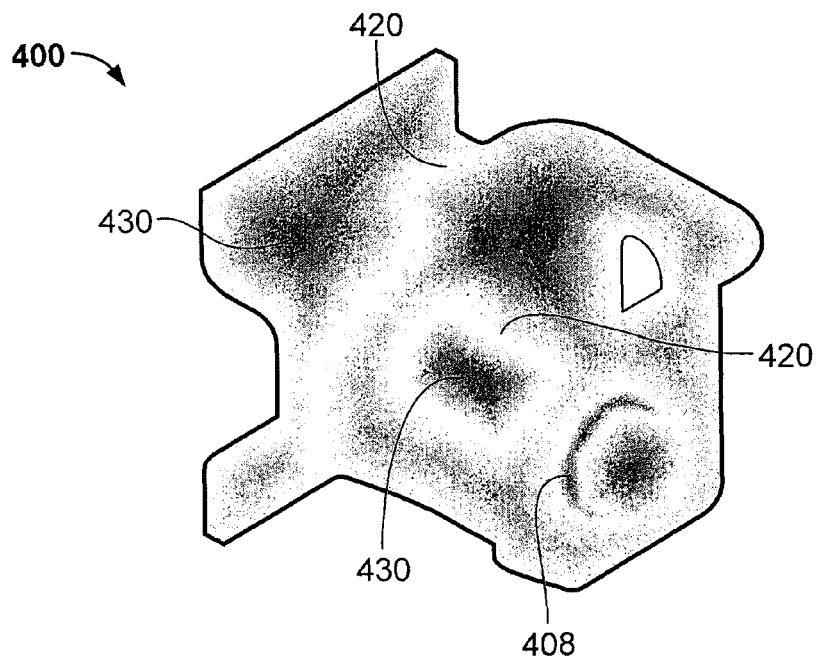
FIG. 4 illustrates an example representation of the image of FIG. 1.

Referring again to FIG. 2, a representation of the image is generated where the representation of the image characterizes each of the image regions (204). For example, a representation of the image 100 can be generated where the representation characterizes each of the image regions 302. FIG. 4 illustrates an example representation 400 of the image 100 of FIG. 1. In some implementations, the representation 400 can be generated based on the ID map 300 as the ID map 300 identifies of each of the image regions 302 (each region 302 corresponding to a component 102). Such characterizations of the image regions 302 by the representation 400 can be used to identify/determine candidate locations for placing annotations for the components 102/image regions 302 as detailed below.

The representation 400 can be generated by one or more techniques. In some implementations, an image can be filtered with an image filter to generate a representation of the image (206). For example, representation 400 can be generated by filtering the image 100 or a version of the image 100, e.g., the ID map 300, with an image filter. Through well-known digital signal processing techniques, a CAD program can use an image filter to filter an image (e.g., as defined by a CAD data file) to generate a representation of the image. In one example, the image filter can be a Gaussian blur filter. The representation 400 is an exemplary result of filtering ID map 300 with a Gaussian blur filter.

Through application of a Gaussian blur filter, the representation 400 illustrates light locales 420 and dark locales 430. The light 420 and dark 430 locales of the representation 400 indicate weighted values of the image pixels comprising the image regions 302 according to a distance between the image pixel and the region boundary of the image region to which the image pixel belongs (e.g., region boundaries 303A and 303B). Within an image region 302, image pixels more distant to the region boundary are more heavily weighted (dark locales 430 as shown in the representation 400) than those image pixels adjacent to the region boundary (light locales 420 as shown in the representation 400). In some implementations, the generation of the representation 400 can be adjusted (e.g., altering the weighting process of the image pixels) by varying the radius, choke (clamp), and/or curve (slope) associated with the filtering process.

It should be noted that changing the orientation of the image 100 (without altering the model on which the image 100 is based) can result in changes to the representation 400. Such a result occurs because the representation 400 is based on the distance of image pixels to the region boundaries according to the camera view of the image, i.e., the perspective from which the image 100 is viewed. For example, when an image 100 is rotated, the distance between the image pixels and the region boundaries will change even though the model from which the image is based does not change. Thus rendering the model at a different viewing angle can dramatically affect the representation 400.

Optionally, for each image region, one or more region centers are determined based on a distance to the region boundary (208). For example, for each image region 302, one or more region centers can be determined based on the distances of the image pixels to the region boundary of that image region (e.g., 303A and 303B) as indicated by the weighted values of the image pixels, e.g., from the representation 400. Areas/image pixels most distance from the region boundary (e.g., the most heavily weighted image pixels of an image region 302) correspond to the one or more region centers. In effect, the one or more region centers are the areas of the image regions 302 most distance from any other image regions 302 and/or the border of the image 100, i.e., the darkest locales 430 of the image regions 302. By way of example, the region center of a circle rendered in a plane perpendicular to the viewing axis is the center point of the circle. Depending on the geometry/configuration of a particular image region 302, there may be multiple region centers. The determination of region centers is non-deterministic, e.g., multiple image pixels or groups of image pixels of an image region 302 may have weighted values that are similar or the same. For example, an image defining an elongated rod having a constant diameter may have image pixels along the rod's centerline with the same weighted values.

With reference to FIG. 2, annotation leader locations for the image based on the representation of the image are determined (212). For example, annotation leader locations for the image 100 (e.g., one annotation leader location for each image region 302) can be determined based on the representation 400. The annotation leader locations are locations within/on an image that correspond to desirable, e.g., unambiguous, sites for placing the portion of an annotation identifying a specific image region or feature of an image ("annotation leader"). Selecting such unambiguous sites, for example, reduces the likelihood a viewer viewing an annotated image will confuse the image region 302 to which a specific annotation is directed. In some implementations, the annotation leader locations are determined based on the one or more region centers (214). For example, the annotation leader locations are selected from one of the region centers, e.g., the most heavily weighted image pixels of an image region 302. In other words, the annotation leader location for each of the image regions 302 is determined based on the image pixel(s) of that image region 302 having the highest weighted values or substantially the highest weighted values. In some situations, e.g., for aesthetic purposes or clarity, an annotation leader location may correspond an image pixel or group of pixels that have a weighted value less than the highest weighed value, such as to avoid two annotation leaders from being in confusing close proximity or to balance the placement of the annotation leaders.

Figure 5:
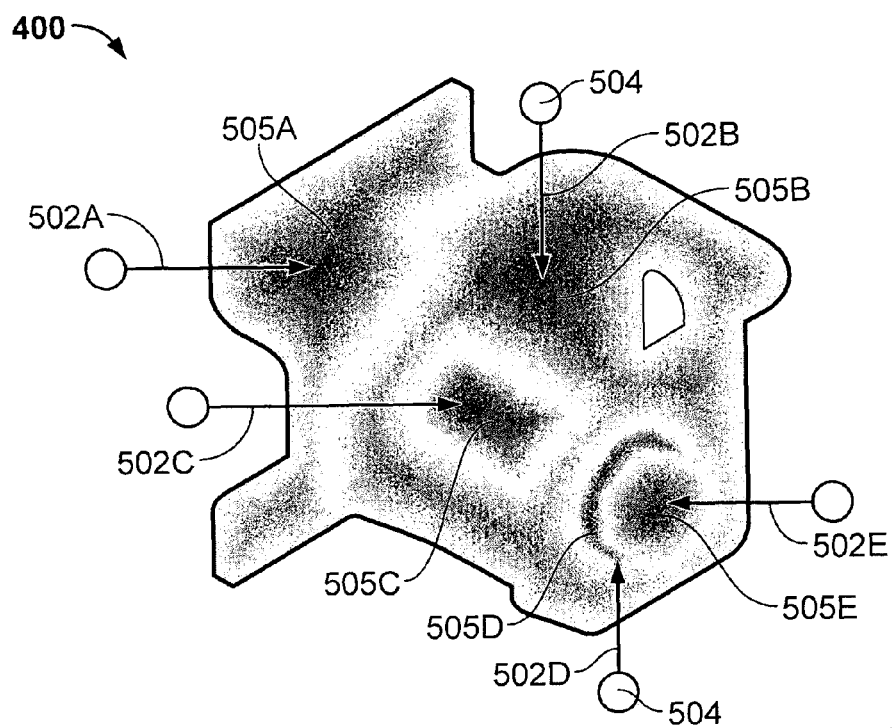
FIG. 5 illustrates example annotation leaders for the image of FIG. 1.

Annotation leaders at the annotation leader locations are automatically generated (216). For example, annotation leaders for each image region 302 are generated at an annotation leader location (e.g., the region centers) determined for that image region 302. FIG. 5 illustrates example annotation leaders 502 for the image 100 of FIG. 1. For example, annotation leaders 502A, 502B, 502C, 502D, and 502E are generated for image regions 302A, 302B, 302C, 302D, and 302E, respectively. In this example, the annotation leaders 502A-502E are generated, respectively, at annotation leader locations 505A-505E corresponding to the region centers of the image regions 302.

Optionally, for each annotation leader, an annotation leader description site can be generated (218) and each annotation description site can be associated with the corresponding annotation leader (220). For example, for each annotation leader 502, an annotation leader description site 504 is generated for and associated with the corresponding annotation leader 502. The annotation leader description sites 504 provide a conduit to convey information about the image regions 302 identified by annotation leaders 502, e.g., textual statements describing the availability of components 102, component 102 part numbers, etc. Generally, the annotation leader description sites 504 are beyond the border of the image 320. In some implementations, the location of each annotation leader description site 504 is dictated by that site's corresponding annotation leader 502. For example, if the annotation leader 502 is on the left side of the image 100 then the annotation leader description site 504 corresponding to that leader 502 is also placed on the left side. The orientation of the annotation leader description sites 504 (e.g., vertical, horizontal, etc.) can also be changed according to user preferences and/or the orientation of the image 100 (e.g., rotating the image 100).

As mentioned above, an image region 302 may have multiple region centers (e.g., image pixels or groups of pixels with the same or substantially the same weighted values). In such situations, the determination of the annotation leader location 505 for an image region 302, the annotation leader 502 generation, and/or the annotation leader description site 504 generation can include an evaluation of the annotation leader locations 505 and/or annotation leader description sites 504 for other image regions 302. In other words, the generation of annotation leaders 502 at annotation leader locations 505 and the generation of the annotation leader description sites 504 can be affected by the placement of annotation leaders 502 and annotation leader description sites 504 for neighboring image regions 302. Such consideration can prevent annotation leaders 502 and/or corresponding annotation leader description sites 504 for different image regions 302 from being confusingly close to each other or otherwise ambiguous. For example, the annotation leaders 502 can be positioned at certain annotation leader locations 505 (e.g., from the pool of available region centers) that satisfy a predetermined threshold distance (e.g., a maximum distance) between the leaders 502 and/or sites 504 of various image regions 302 to permit the annotation leaders 502 and/or sites 504 to unequivocally identify and describe the image regions 302.

In other implementations, in addition to minimizing ambiguities, the annotation leaders 502 and/or annotation leader description sites 504 can be positioned so as to balance the image 100, e.g., three sites 504 for the top right quadrant of the image and three sites 504 for the bottom right quadrant of the image.

Figure 6:
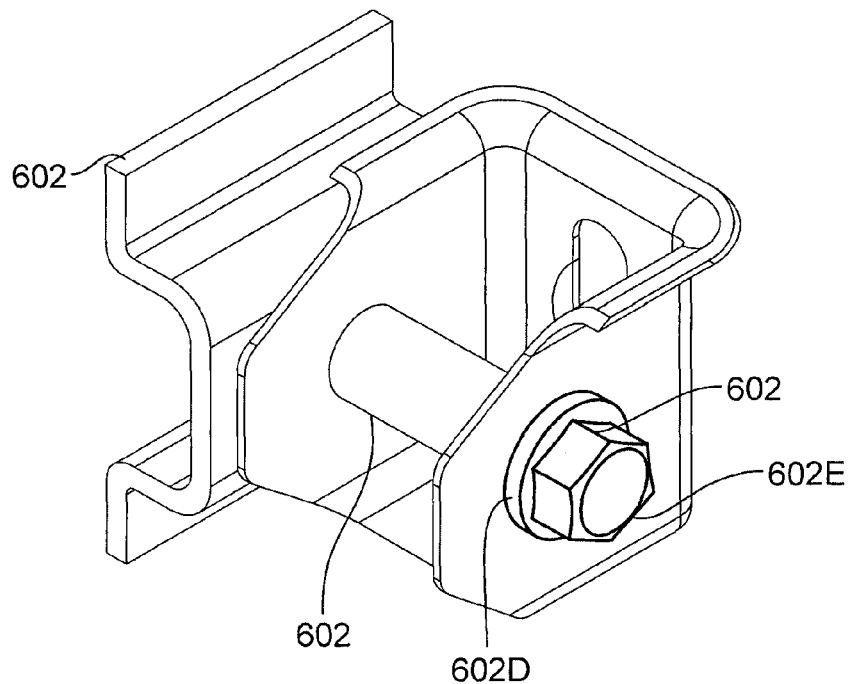
FIG. 6 illustrates example contour edges of the image regions of FIG. 3.

Each image region 302 may also have contour edges defining an outline of the image region 302, such as a three-dimensional outline of the image region 302. Inherently, the three-dimensional outline defined by the contour regions include the region boundary of the image region 302. FIG. 6 illustrates example contour edges 602 of the image regions 302 of FIG. 3. Thus for image regions 302 rendered for three-dimension components 102, the contour edges 602 provide, for example, X, Y, and Z dimensional information with reference to a Cartesian coordinate system (e.g., the contour edges 602 define the visible edges of the images regions 302/components 102). For example, the contour edges 602 provide depth information within an image region 302 (whereas image regions 302 defined only by the region boundaries generally do not). Depending on the image 100, determining region centers based on a distance to the region boundary may not always produce unambiguous results (e.g., it may be difficult to discern which region center is associated with which image region 302). For example, after filtering the image 100 (e.g., ID map 300) with the Gaussian blur filter, the area 408 around the engagement between the plate 102D and the nut 102E of representation 400 of FIG. 4 is ambiguous, i.e., it is hard to tell from the dark locales 430 where to unambiguously place annotation leaders for the plate 102D and the nut 102E.

As such, determining the region centers based on a distance to the region boundary can include the use the contour edges 602. Optionally, a distance to one or more contour edges of the image region is determined (210). For example, for each image region 302 the determination of the region centers can be based on the distance between the contour edges 602 and the image pixels of the image region 302. Because the contour edges 602 include the region boundary and additional boundaries within the confines of the image region 302 (e.g., contours defining edges 602D of plate 102D and edges 602E of nut 102E), utilizing the contour edges 602 breaks up the individual image regions 302 into image region subsections. Each subsection is defined by one or more of the contour edges 602. Thus for a given image region 302 decomposed into subsections, the weighted values of the image pixels when determined as a function of the image pixels' distance to the contour edges will be no greater and often less than the weighted values of image pixels of an image region 302 not decomposed into subsections. Advantageously each subsection will have a region center. This allows an annotation leader location 505 to be selected/determined based on any one of the region centers of the image subsections. This extra degree of image region resolution and granularity results from the more detailed description of the image 100 by the contour edges 602/subsections (as compared to the region boundaries) and assists in determining unambiguous annotation leader locations 505 and the subsequent placement of annotation leaders 502.

Figure 7:
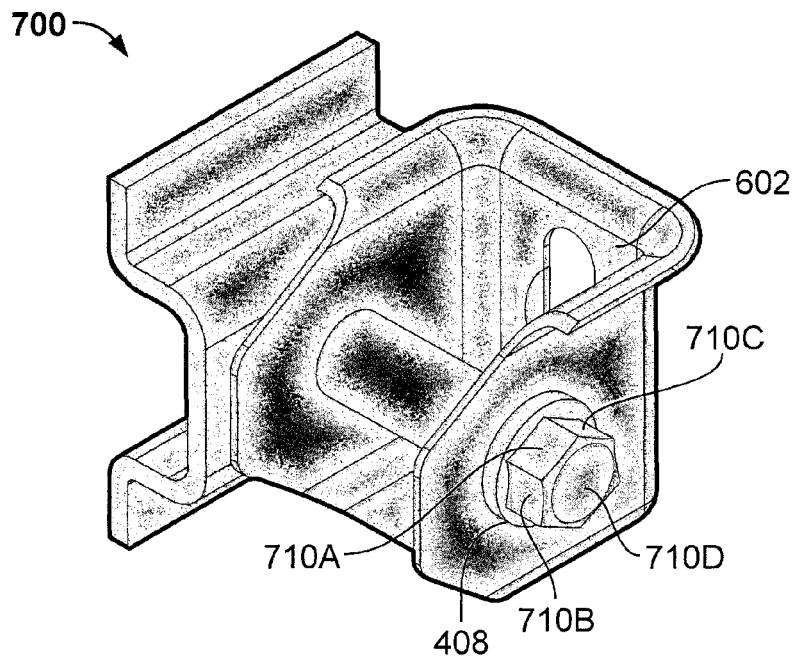
FIG. 7 illustrates another example representation of the image of FIG. 1.

For example, as mentioned above, before utilizing the contour edges 602 and the resulting subsections, the placement of annotation leaders 502 in the vicinity of area 408 for the 102D or the nut 102E is unclear from representation 400 because the only edges/boundaries from which the region centers are determined are the region boundaries. FIG. 7 illustrates another example representation 700 of the image 100 of FIG. 2. For example, representation 700 can be generated by filtering the ID map 300 which includes the contour edges 602 with a Gaussian blur filter. As a result of the additional constraints (i.e., the contour edges of plate 102D and nut 102E) the resolution of area 408 is increased because the region centers are now determined based on distances to the contour edges 602 for each subsection of the image region 302, which provide more detail of the image region than relying only on the region boundaries. Thus for an image region 302, a region center from any of the image region subsections can be selected as the annotation leader location 505 for that image region 302. For example, the nut 102E (corresponding to image region 302E) now includes subsections 710A-710D, each with its own region center. Because representation 700 includes more region centers to select from, and the region centers more fully describe the image region 302 (as compared with representation 400 which relies solely on the region boundaries) annotation leader locations 505 can be chosen that minimize image region identification ambiguities. In some implementations, the image 100 (e.g., ID map 300) always includes or is overlaid with contour edges 602 for some or all of the image regions 302. Thus regardless of whether determining region centers based on only a distance to the region boundary produces unambiguous results, the image regions 302 in such implementations are always decomposed into image regions subsections by the contour edges 602 for image filtering purposes (e.g., to generate an image representation).

With reference to FIG. 2, the annotation leaders and the image are displayed (222). For example, the annotation leaders 502 and the image 100 are concurrently displayed. In another example, the annotation description sites 504 are also displayed with the image 100 and annotation leaders 502.

In some implementations, some or all of steps 202, 204, 212, 216, 222 and, optionally, steps 206, 208, 210, 214, 218, and 220 are performed after each image region 302 has been added to image 100. For example, as each of components 102 are added to the hinge assembly model, steps 202, 204, 212, 216, 222 and, optionally, steps 206, 208, 210, 214, 218, and 220 are performed. Thus, as each new component 102 is added, a CAD designer can annotate that component 102 without significant delay. However, in other implementations, some or all of steps 202, 204, 212, 216, 222 and, optionally, steps 206, 208, 210, 214, 218, and 220 are performed after the image is complete (e.g., the hinge assembly model is fully designed).

Further, in various implementations either during the generation of the image 100 (e.g., during the design of the hinge assembly model) or after the image has been completed, any manipulations of the image (e.g., re-sized, moved, scaled, rotated, and zoomed in or out on) cause some or all of steps 202, 204, 212, 216, 222 and, optionally, steps 206, 208, 210, 214, 218, and 220 to be performed.

It should also be noted that one or more of the steps 202-220 can be transparent to the user (e.g., CAD designer). For example, as a CAD designer adds a new component 102 to a CAD model (e.g., image 100), the CAD designer may only be aware of the display of the image 100 and annotation leaders 502 (step 222) and not necessarily the steps required to produce the display.

Figure 8:
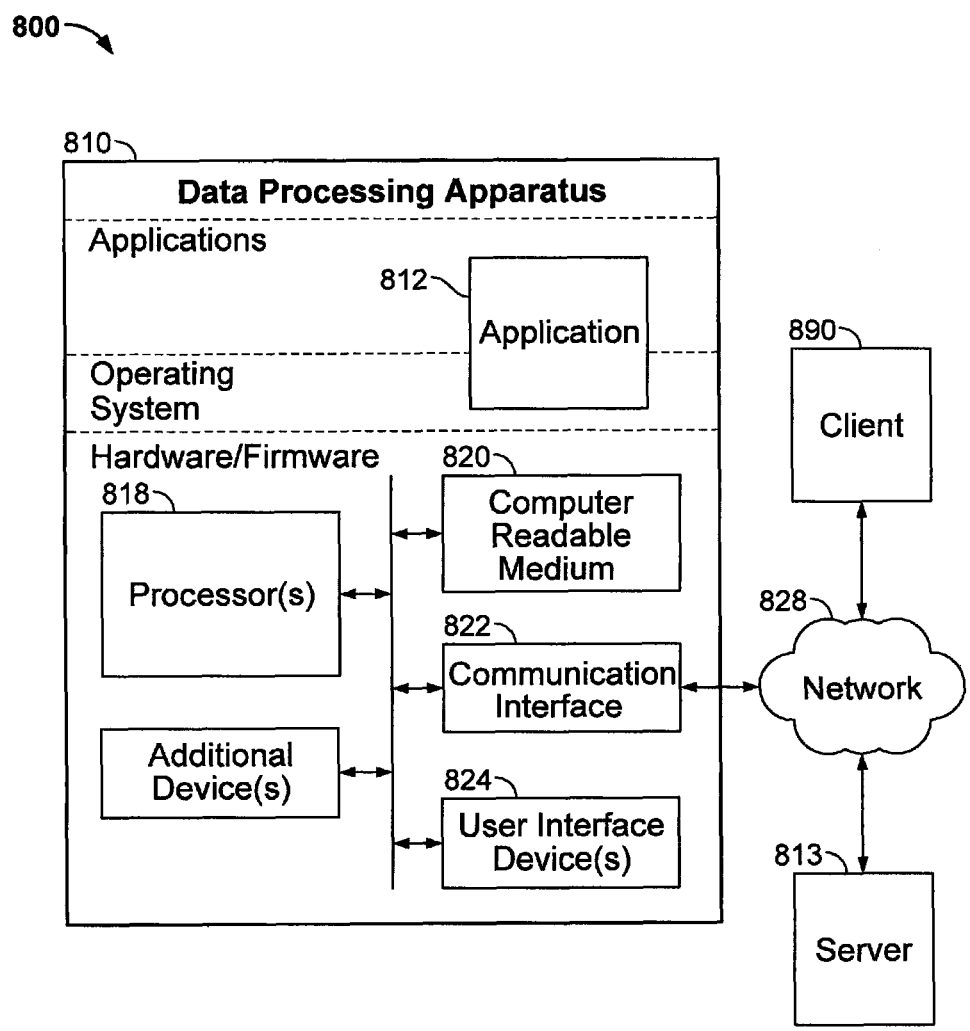
FIG. 8 is a block diagram showing an example system configured to automatically annotate an image.

FIG. 8 is a block diagram showing an example system 800 configured to automatically annotate an image. For example, system 800 can be used to automatically annotate image 100 as described above. A data processing apparatus 810 includes hardware/firmware, an operating system and one or more applications or application modules, including an application 812. The application 812 can be, for example, a CAD program. As used within this specification, the term "application" refers to a computer program that the user perceives as a distinct computer tool used for a defined purpose. The application 812 can be built entirely into the operating system (OS) of the data processing apparatus 810, or the application 812 can have different components located in different locations (e.g., one portion in the OS or kernel mode, one portion in the user mode, and one portion in a remote server, such as server 813), and the application 812 can be built on a runtime library serving as a software platform of the apparatus 810. Moreover, the application 812 can be a GUI application that connects to one or more processors 818 (e.g., one or more Web servers) over a network 828 and provides functionality, such as CAD functionality, as a network service. The application 812 includes software having machine-readable instructions that, when executed, automatically annotate an image to be displayed by the data processing apparatus 810.

The data processing apparatus 810 includes one or more processors 818 such as a graphical processing unit 818 and at least one computer-readable medium 820. In some implementations, the graphical processing unit 818 is configured for one or more of: identify image regions 302 within an image 100 (e.g., step 202); generate a representation 400 or 700 of the image 100 (e.g., step 204); determine annotation leader locations 505 for the image 100 based on the representation 400 or 700 (e.g., step 212); generate annotation leaders 502 at the annotation leader locations 505 (e.g., step 216); filter the image 100 with an image filter (e.g., step 206); determine the annotation leader locations 505 based on the weighted values of the image pixels; determine one or more region centers based on a distance to the region boundary (e.g., step 208); determine the annotation leader locations 505 based on the one or more region centers (e.g., step 214); determine a distance to one or more of the contour edges 602 of the image region 302 (e.g., step 210); generate an annotation leader description site 504 (e.g., step 218); and associate each annotation leader description site 504 with a corresponding annotation leader 502 (e.g., step 220).

The at least one computer-readable medium 820 can include a random access memory (RAM) a program memory (for example, a writable read-only memory (ROM) such as a flash ROM), a hard drive, and a removable disk drive (e.g., a floppy disk, compact disk (CD), or digital versatile disk (DVD) drive). All such computer-readable media can be suitable for storing executable or interpretable computer programs and instructions, including programs or application components embodying aspects of the subject matter described in this specification. In addition, the data processing apparatus 810 can include a hard drive controller, a video controller, and an input/output (I/O) controller coupled by a system bus. The apparatus 810 can be preprogrammed, in ROM, for example, or it can be programmed (and reprogrammed) by loading a program from another source (for example, from a floppy disk, a CD-ROM, DVD, or another computer).

The data processing apparatus 810 can also include one or more input/output (I/O) interface devices, a computer monitor display 824 adapted to display the image, annotation leaders, the annotation leader description sites, the image representation, and other outputs of the CAD program; a computer keyboard or mouse adapted to provide inputs to the CAD program; a wireless and/or wired communication interface 822. The data processing apparatus 810 can communicate with one or more clients 890 or servers 813 using the communication interface 822 over network 828 according to the type of communication implemented by the network 828. For example, the communication interface 822 can communicate using a wireless Bluetooth session, a wireline USB session, a TCP/IP session (both wireless and wireline), a wireless infra-red (IR) session, or other communication sessions using the appropriate network. That is, network 828 may be a Bluetooth network, a USB network, TCP/IP network, an IR network, or a variety of other types of networks. Once programmed as described in this specification, the data processing apparatus 810 is operable to automatically generate annotations using any of the techniques described in this specification.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
    identifying image regions within an image, wherein each of the image regions is associated with a region identifier, the region identifier corresponding to a rendered color for that image region, and wherein the image region comprises image pixels and a region boundary, the region boundary defining a boundary of the image region based on the rendered color for the image region;
    generating a representation of the image using a Gaussian blur filter, wherein the representation of the image characterizes each of the image regions and wherein, for each image region, the representation of the image indicates weighted values of the image pixels of the image region according to a distance between the image pixels of the image region and the region boundary;
    determining annotation leader locations for the image based on, at least, the weighted values of the image pixels in the representation of the image;
    generating annotation leaders at the annotation leader locations; and
    providing the annotation leaders and the image.

2. The method of claim 1, wherein the image defines an assembly model having assembly components and the image regions correspond to the assembly components, the assembly model and the assembly components generated by use of a computer aided design program.

3. The method of claim 1 wherein generating the representation of the image, further comprises:

for each of the image regions, determining one or more respective region centers based on a distance to the image region boundary.

4. The method of claim 3, wherein determining the annotation leader locations further comprises:
    determining the annotation leader locations based on the one or more respective region centers.

5. The method of claim 3, wherein each of the image regions has respective contour edges defining an outline of the image region, and wherein determining the one or more region centers based on the distance to the image region boundary comprises:
    determining a distance to one or more of the contour edges of the image region.

6. The method of claim 5, wherein the contour edges define a three-dimension outline of the corresponding image region.

7. The method of claim 1, further comprising:
    for each of the annotation leader locations, generating an annotation leader description site; and
    associating each annotation leader description site with a corresponding annotation leader location.

8. A system comprising:
    a computer-readable medium having instructions stored thereon; and
    data processing apparatus programmed to perform operations comprising:
        identifying image regions within an image, wherein each of the image regions is associated with a region identifier, the region identifier corresponding to a rendered color for that image region, and wherein the image region comprises image pixels and a region boundary, the region boundary defining a boundary of the image region based on the rendered color for the image region;
        generating a representation of the image using a Gaussian blur filter, wherein the representation of the image characterizes each of the image regions and wherein, for each image region, the representation of the image indicates weighted values of the image pixels of the image region according to a distance between the image pixels of the image region and the region boundary;
        determining annotation leader locations for the image based on, at least, the weighted values of the image pixels in the representation of the image;
        generating annotation leaders at the annotation leader locations; and
        providing the annotation leaders and the image.

9. The system of claim 8 wherein the image defines an assembly model having assembly components and the image regions correspond to the assembly components, the assembly model and the assembly components generated by use of a computer aided design program.

10. The system of claim 8 wherein generating the representation of the image, further comprises:
    for each of the image regions, determining one or more respective region centers based on a distance to the image region boundary.

11. The system of claim 10 wherein determining the annotation leader locations further comprises:
    determining the annotation leader locations based on the one or more respective region centers.

12. The system of claim 10 wherein each of the image regions has respective contour edges defining an outline of the image region, and wherein determining the one or more region centers based on the distance to the image region boundary comprises:

determining a distance to one or more of the contour edges of the image region.

13. The system of claim 12 wherein the contour edges define a three-dimension outline of the corresponding image region.

14. The system of claim 8 wherein the operations further comprise:
- for each of the annotation leader locations, generating an annotation leader description site; and
- associating each annotation leader description site with a corresponding annotation leader location.

15. A computer-readable medium having instructions stored thereon that, when executed by data processing apparatus, cause the data processing apparatus to perform operations comprising:
- identifying image regions within an image, wherein each of the image regions is associated with a region identifier, the region identifier corresponding to a rendered color for that image region, and wherein the image region comprises image pixels and a region boundary, the region boundary defining a boundary of the image region based on the rendered color for the image region;
- generating a representation of the image using a Gaussian blur filter, wherein the representation of the image characterizes each of the image regions and wherein, for each image region, the representation of the image indicates weighted values of the image pixels of the image region according to a distance between the image pixels of the image region and the region boundary;
- determining annotation leader locations for the image based on, at least, the weighted values of the image pixels in the representation of the image;
- generating annotation leaders at the annotation leader locations; and
- providing the annotation leaders and the image.

16. The computer-readable medium of claim 15 wherein the image defines an assembly model having assembly components and the image regions correspond to the assembly components, the assembly model and the assembly components generated by use of a computer aided design program.

17. The computer-readable medium of claim 15 wherein generating the representation of the image, further comprises:
- for each of the image regions, determining one or more respective region centers based on a distance to the image region boundary.

18. The computer-readable medium of claim 17 wherein determining the annotation leader locations further comprises:
- determining the annotation leader locations based on the one or more respective region centers.

19. The computer-readable medium of claim 17 wherein each of the image regions has respective contour edges defining an outline of the image region, and wherein determining the one or more region centers based on the distance to the image region boundary comprises:
- determining a distance to one or more of the contour edges of the image region.

20. The computer-readable medium of claim 19 wherein the contour edges define a three-dimension outline of the corresponding image region.

21. The computer-readable medium of claim 15 wherein the operations further comprise:
- for each of the annotation leader locations, generating an annotation leader description site; and
- associating each annotation leader description site with a corresponding annotation leader location.

* * * * *